United States Patent [19]

Whitney

[11] 3,730,985

[45] May 1, 1973

[54] VIEWING AND MEASURING SYSTEM FOR REMOTE THERMAL ENERGY SOURCES

[75] Inventor: Theodore R. Whitney, Woodland Hills, Calif.

[73] Assignees: Frank D. Orloff, Oildale; Everett C. Murray, Bakersfield; Miles I. Rider, Delano, Calif.

[22] Filed: Sept. 18, 1970

[21] Appl. No.: 73,488

[52] U.S. Cl. ..........178/6.8, 178/DIG. 1, 178/DIG. 8, 178/DIG. 20, 250/83.3 HP

[51] Int. Cl. ..........G01j 5/02, G01t 1/16, H04n 7/18

[58] Field of Search ..........178/6.8, DIG. 8, 178/7.6, DIG. 30, DIG. 1, DIG. 20, 7, 82, ; 250/83.3 HP, 83.3 H, 238, 83.3 HP

[56] References Cited

UNITED STATES PATENTS

| | | | |
|---|---|---|---|
| 3,230,819 | 1/1966 | Noxon | 178/DIG. 1 |
| 3,129,285 | 4/1964 | Miller | 178/7.82 |
| 3,423,051 | 1/1969 | Jakab | 178/DIG. 8 |
| 3,571,504 | 3/1971 | Kiuchi | 178/DIG. 8 |
| 3,488,500 | 1/1970 | Welti | 178/DIG. 8 |
| 3,069,493 | 12/1962 | Martel | 178/DIG. 8 |
| 2,193,606 | 3/1940 | Ulrey | 178/DIG. 8 |
| 3,581,109 | 5/1971 | Olsson et al. | 178/DIG. 8 |
| 3,261,014 | 7/1966 | Diaz | 178/DIG. 8 |
| 1,988,931 | 1/1935 | Alexanderson | 178/7.88 |
| 3,509,344 | 4/1970 | Bouwers | 250/83.3 HP |
| 3,641,348 | 2/1972 | Schwarz | 250/83.3 HP |
| 3,508,051 | 4/1970 | Nichols et al. | 250/83.3 HP |
| 3,379,830 | 4/1968 | Menke | 178/6.8 |
| 2,288,871 | 7/1942 | Adams | 178/DIG. 20 |
| 3,554,628 | 1/1971 | Kennedy | 178/DIG. 8 |

*Primary Examiner*—Howard W. Britton
*Attorney*—Huebner & Worrel

[57] ABSTRACT

A system for analyzing the temperature and other radiant energy characteristics of remotely located radiant energy sources which is provided with both an optical viewing system having a selected field of view, and a scanning and electronic display system viewing at least a portion of the selected field of view. The optical system provides a relatively wide information bandwidth display presenting an optical image having high detail but relatively low contrast, while the scanning and display system provides a relatively narrow information bandwidth display presenting a generated image with an extremely high level of contrast, typically of infrared sources having predetermined energy levels. The generated image preferably is in a distinct color from the optical image, and the images are superimposed for viewing by an operator in a manner such as to be distinctly displayed and spatially related.

42 Claims, 6 Drawing Figures

THEODORE R. WHITNEY
INVENTOR

Huebner & Worrel
ATTORNEYS

THEODORE R. WHITNEY
INVENTOR

Huebner & Worrel
ATTORNEYS

THEODORE R. WHITNEY
INVENTOR

Huebner & Worrel
ATTORNEYS

THEODORE R. WHITNEY
INVENTOR

Huebner & Worrel
ATTORNEYS

VIEWING AND MEASURING SYSTEM FOR REMOTE THERMAL ENERGY SOURCES

BACKGROUND OF THE INVENTION

This invention relates to systems for remotely analyzing radiant energy emissions, and particularly to systems for detecting and measuring thermal energy sources.

A number of different systems and techniques are known and are in use for the remote detection of radiant energy sources that do not provide visible radiation. Most of such systems operate on infrared emissions, and utilize focusing and detection systems that are sensitively responsive to the infrared energy. Such systems vary from relatively simple point radiometers to complex infrared scanning systems that generate a television-like display of a scanned field. The present invention is concerned with the generation of an information display having substantially greater bandwidth and more meaningful presentation of display information than existing electronic scanning systems for thermal energy sources.

In existing scanning systems, high contrast and sensitivity are substantially inconsistent with the generation of a wide bandwidth picture having substantial detail. Wide bandwidth requires a high scanning rate, but the higher the scanning rate the more limited is the dynamic range of the detected signal and the lower the contrast. To provide a display in which the thermal gradients are clearly depicted therefore requires a slow scanning rate, such as four frames per second or less. Such a display not only has substantial flicker but its practical uses are limited to virtually static viewing of remote sources.

For industrial applications in which it may be desired to scan a great number of electronic or electrical equipment components to identify those that are in excess of a selected temperature, such an arrangement is not feasible. If the scanning rate is speeded up to 30 frames per second, as sometimes used for television presentation, the contrast is lost and an object that is, for example, 10° F. hotter than its environment may not be identifiable. For many applications, particularly in the electrical and electronic fields, detection of temperature differentials of only a few degrees is highly desirable. Existing systems provide this capability only by slow and painstaking sequences involving slow scanning of desired objects for examination.

Existing infrared scanning systems also are limited in flexibility, generally having fixed scanning rates and requiring substantial equipment. Typically, one operator is required to aim and control a viewing mechanism, while a second operator is required to view the display. Thus usage of this system tends to require specially prepared vehicles having specifically designed complex installations and power supplies.

SUMMARY OF THE INVENTION

The objects and purposes of the present invention are achieved by a system in which a relatively low contrast wide bandwidth display of a field of view includes a superimposed high contrast, distinctive second display. The superimposed display is electronically generated to represent objects having particular characteristics, such as thermal energy sources of a specific temperature within at least a portion of the field of view. A single operator viewing through this system has both physical and spatial references for remote sources under examination, and also unmistakeable and nonambiguous presentations of sources having predetermined radiation characteristics.

In a specific example of a system in accordance with the invention, an optical viewing system and an infrared scanning and display system are disposed within a compact housing along substantially parallel and adjacent optical paths. The optical viewing system provides a display of a selected field of view to an operator, this display incorporating neutral and colored filters, if desired, to provide a low contrast but high bandwidth image. The infrared scanning system scans at least a selected portion of this field of view, the signal being detected by a cryogenically cooled cell that controls the video input of a scanning cathode ray tube also disposed within the housing and which generates a display in a contrasting color. The electronic scanning system incorporates movable elements for generating the picture raster, these elements in this particular example scanning in mutually orthogonal directions and being driven by independently variable drive systems. The scan at the cathode ray tube is individually controlled by the independent drive systems, to generate a corresponding display at whatever scanning rates are selected.

An image reflecting system incorporating selective light transmitting and reflecting elements is disposed to superimpose the image from the display tube onto the optical image, with point correspondence between sources in the optical and electronically scanned fields of view. Consequently, within a detailed picture of an overall hue, such as red, point sources in excess of a selected temperature may appear as bright blue dots or areas. Although the infrared scanning system can be highly sensitive, the contrasting displays and the spatial relationship between the overall reference field and points illuminated in the display provide a uniquely meaningful representation for the operator. The operator can scan many potential sources at a high rate of speed and readily identify particular objects having known emissivities by their radiant energy states which are dependent upon temperature.

A number of additional aspects of systems in accordance with the invention are of particular significance. This system is compactly arranged within a single housing including system electronics as well as display, so that it may be disposed on a tripod, in a vehicle mount, or on its own separate operator's support mount.

The operator not only is able to provide independent controls of the scan rates, but the system incorporates gain, mode and threshold control circuits which permit detailed examination of the emissivity characteristics of a field of view or an object. To this end, another feature of the invention involves a video amplification system incorporating a first variable gain stage and a second, high gain variable threshold stage. While employing this system, the operator can concurrently select the linear amplification mode, and any one of a number of predetermined gain values, such that a temperature gradient display or picture is generated covering one of a number of predetermined temperature bands. For precise analysis of the temperature of a given source, however, the second amplification stage may be utilized, so that only thermal energy sources above the selected temperature level are displayed, and with substantially equal intensity. This nonambiguous and essentially digital indication, varying between on and off states, is used by the operator to make extremely precise temperature measurements of the remote source.

Another feature of systems in accordance with the invention is the incorporation of an internal display of temperature. The threshold control operated by the operator is coupled to control an illuminated scale, disposed in a light path so that its image is reflected into a selected portion of the optical field of view, thereby providing the operator with a direct indication of temperature without diverting his attention from the scene.

Further in accordance with the invention, improved infrared scanning systems are provided, having high sensitivity and linearity while being economical in construction. With the employment of mechanical scanning members and a cryogenically cooled cell, internal reflections and distortions can affect the video signal. The optical path of the system incorporates a tilted silicon window along the principal scanning axis, and further includes a selectively insertable bandpass filter for the infrared spectrum, to minimize the effects of excessive external radiation. Also, the optical slit may be disposed on the far side of a rotating light scanning prism from the detector cell, and internal reflection of the cold body image presented by the cell of the prism faces is electronically cancelled in the video amplifiers by a triggered variable waveform generator.

Another aspect of the invention relates to the scan control for the display system. The linear position transducer, coupled to an oscillating mirror that provides the primary reflector in the scanning path, generates a signal to provide scan control in the equivalent direction in the display. Scan control in the other direction is controlled by a triggered sweep generator operated by an optical sensing system that is responsive to the instantaneous angular position of the rotating prism. Advantage is taken of the fact that the prism reflects light, by disposing the light source to generate a beam that scans as the prism face shifts, so as to generate signals denoting the start and end of a given line scan by the prism.

BRIEF DESCRIPTION OF THE DRAWINGS

A better understanding of the invention may be had by reference to the following description, taken in conjunction with the accompanying drawings, in which.

DETAILED DESCRIPTION OF THE INVENTION

Figure 1:
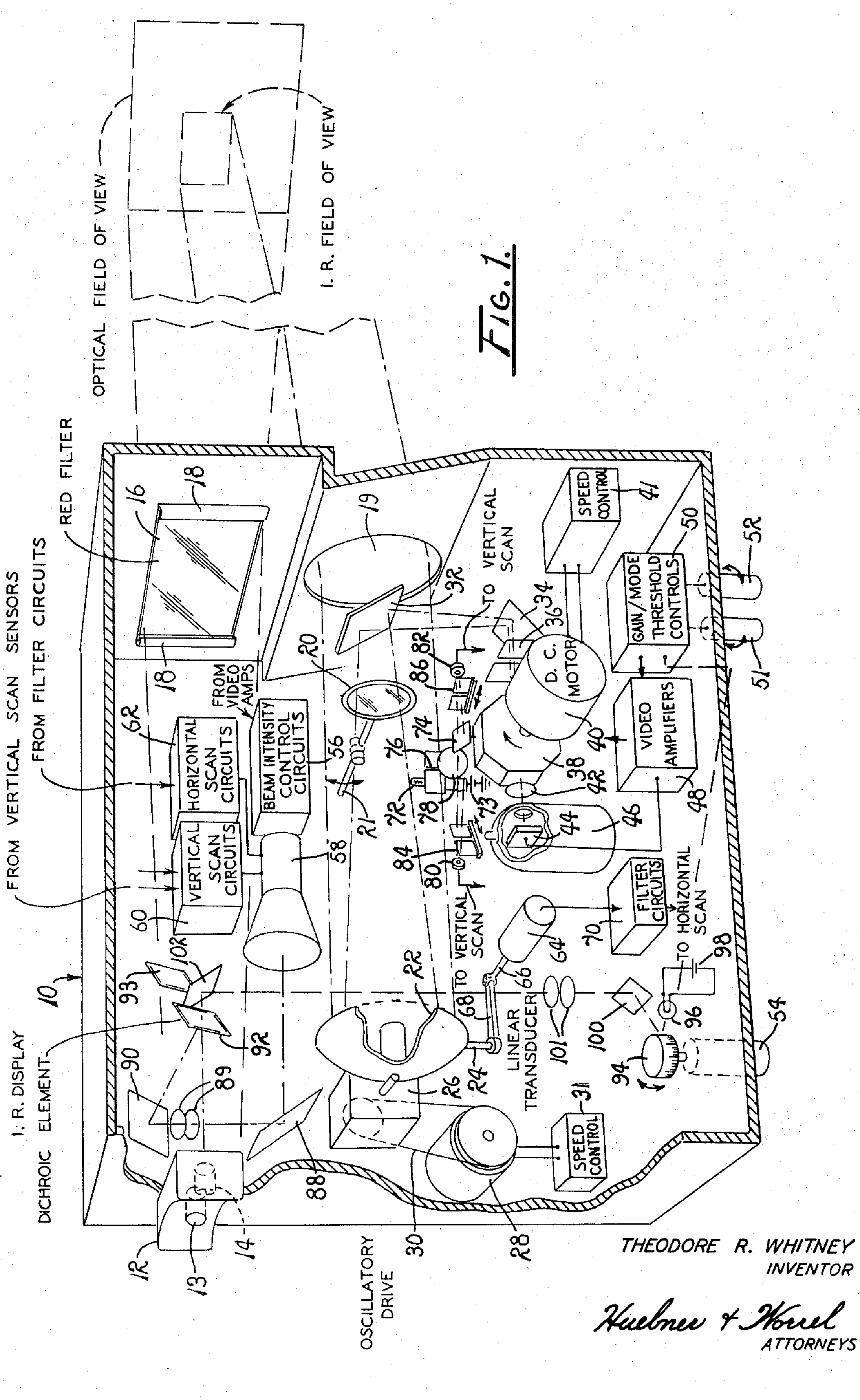
FIG. 1 is a combined perspective and block diagram view of a system which embodies the principles of the instant invention.

A system for providing a display of selected objects present within a given field of view is illustrated in FIG. 1, to which reference is now made.

The system utilizes a pair of electromagnetic wave energy viewing systems, one of which is optical and the other of which is an electronic scanning system. The two viewing systems and the display system are disposed within a television camera type housing 10 that may be suspended, mounted on a fixed or movable element on a vehicle, mounted on a tripod or on its own means of locomotion. The arrangement of FIG. 1 is illustrative of a portable embodiment of the instant invention, and incorporates signal processing, display electronics, and a portable power supply (not shown).

A first, optical, viewing system is disposed principally within the top interior portion of the housing 10. The housing, for purposes of reference, may be said to have a front end directed toward the field of view under examination, and a rear end at which an operator looks in a hooded viewfinder 12 through a pair of viewfinder eyepieces 13 and 14. The first viewing system is disposed along an optical axis extending from front to rear, and having a transparent front filter panel 16 which together with the viewfinder system provides an approximately 15° × 20° field of view. In this example, the transparent filter panel 16 comprises a rectangular, red filter slidably mounted in two channels 18 disposed along the opposite vertical sides of a rectangular front viewing aperture provided in the housing 10. The filter 16 is selected to reduce both the illumination level and the contrast of the optical field under view. Neutral filters or other colors may additionally or alternatively be employed. The optical viewing system therefore comprises an information display system of extremely wide bandwidth, comprising at least an order of magnitude greater bandwidth than the nominal 3.58 megacycle bandwidth of a typical television picture. The operator sees all the detail in the 15° × 20° field, but in various shades of red, and somewhat attenuated.

A second, viewing system is an electronic scanning and display system responsive solely to infrared excitations from thermal energy sources in a portion of the field of view under examination. The second viewing system is mounted along a viewing axis generally parallel to the optical axis of the first viewing system. In view of the fact that most objects under examination will be remote from the scanner, the relatively small displacement between the axes is insignificant. However, means for parallax correction at short focusing distances are included in a practical exemplification, but have not been shown for brevity and ease of understanding. The field of view for the infrared scanning system is approximately 4° × 5° and preferably is presented within the central region of the optical field of view.

Electromagnetic energy within the infrared scanner field of view is passed along the viewing axis through a silicon window 19 disposed in a tilted portion of the front wall of the housing 10. The silicon window 19 acts as a band pass for the entire IR (infrared) spectrum, rejecting wavelengths outside the band of approximately 1.2 to 10.0 microns. Additionally, the beam path optionally passes through a pivotable four micron filter 20, shifted between in-path and out-of-path positions by an external handle 21 pivotally mounted on the housing 10 and including a conventional detent locking mechanism (not shown). The 4 micron filter 20 transmits only wavelengths of greater than 4 microns and is moved into the path when viewing brightly lit fields, in effect to reduce noise under these conditions. The filter 20 is disposed, as shown, along a reflected portion of the IR beam path so that it can be of smaller area than would be needed if it were positioned adjacent the silicon window 19. It will be appreciated that conventional support and mounting structures, and optical shielding structures, have not been depicted in the arrangement of FIG. 1. in order to simplify the representation and description of the invention.

The IR energy passing from the window 19 reflects off a concave mirror 22 mounted on a vertically disposed support shaft 24 in bearings (not shown), so that the mirror 22 can be oscillated horizontally or in transverse directions. The oscillatory movement of the mirror 22 is limited to only a few degrees, at the most, provided by an oscillatory drive 26. The drive 26 includes any convenient cam or linkage mechanisms suitable for imparting the oscillatory movement. The oscillatory drive 26, preferably, is driven through a belt drive 30, at a selected rate, by a first DC motor whose speed is adjusted through a speed control 31. The speed control 31 acts to adjust the motor drive voltage in a conventional manner. The scan rate of the mirror 22 is here selected to be 10 cycles per second, therefore producing 10 opposite movements in each direction per second, or a total of 20 horizontal scans per second.

The light reflected back from the concave mirror 22 in the infrared scanning system is returned to a first planar mirror 32 disposed in a forward position along the second viewing axis, and angled to divert the focused scanning beam in a direction substantially normal to the viewing axis. The beam is directed off a second mirror 34 that is positioned at an angle of approximately 45° relative to the beam to pass the beam through an optical slit device 36. Selectively insertable filters, not shown, but similar to the filter 20, are advantageously positioned in the path between the mirror 34 and the slit device 36 because of the concentrated beam in this region. The reflection off the mirror 22 is a field image that is oscillated from side to side in space. The image through the slit 36 is a line beam representing successive portions of the field.

The rotating octagonal prism 38 provides a point scan along the line beam presented by the slit 36. This principle has been used for many years in high speed photography and other applications, therefore a detailed description thereof is omitted in the interest of brevity. However, it is to be understood that as the instantaneous angular position of the prism 38 changes, with a given prism face being disposed opposite the slit 36, different segmental lengths of the line beam are refracted at the particular angle corresponding to a selected output axis through the prism. Consequently, the line beam is scanned and a concentrated point beam is generated. The octagonal prism is driven by a second DC motor 40. As a practical matter, the motor 40 is driven at 200 rps (revolutions per seconds) to provide 1,600 scans per second along successive lines. A speed control 41 is used to set the speed of the DC motor 40, selectively by use of a given motor drive voltage. Taking the direction of oscillation of the mirror 22 as the horizontal scan, the prism 38 may be said to provide the vertical scan, although the expressions horizontal and vertical are used for ease of reference only, and it is to be understood that the system can be utilized in any attitude and that the scanning directions and motions can be varied substantially. With 20 horizontal scans per second, at the mirror 22, the scanning action provides the basis for a display picture having 20 fields of view per second, with each field of view having 80 lines.

In a practical example of a system, a scanning system having 1 angular mil of resolution was provided. It will be appreciated by those skilled in the art that scans in polar coordinates, or various forms of curvilinear or rectangular scanning patterns may alternatively be employed, however, the present arrangement provides an advantageous scanning system. In particular, as is described in more detail hereafter, the scanning rates may virtually be completely independent in order to provide selection of bandwidth, contrast and resolution.

A focusing lens 42 and a detector cell 44 successively are positioned along the output optical axis from the rotating prism 38, so that a point beam falls upon the detector cell 44, which in this example comprises an indium antimonide cell. The cell 44 is disposed in thermal exchange relationship with a cryogenic source comprising a Dewar vessel 46 containing liquid nitrogen. As is well known, cooling of the cell 44 substantially reduces the inherent noise and increases the sensitivity and response of the cell. Optical shielding from ambient light and from other internal sources of light or infrared energy normally is employed but has not been shown for simplicity.

Signals generated by the detector cell 44 are coupled to a sequence of video amplifiers 48, including controls 50 for gain, mode and threshold adjustment. Control handles 51 and 52 for convenient switches, represented in somewhat idealized form, extend from the housing 10 to permit operator selection of gain and mode. A separate control handle 54 is shown as utilized for control of the threshold, a specific example of the amplifiers 48 and control circuits 50 being hereafter given.

The mode control permits operation in either nonlinear or linear modes, the gain control permits adjustment of the dynamic range in the system, and the threshold control permits selection of a threshold level above which the video circuits are responsive. The output signal from the video amplifiers 48 is coupled to beam intensity control circuits 56 providing intensity modulation of the display of a small cathode ray tube 58. The display face of the cathode ray tube 58 includes a blue emitting P–11 phosphor, and defines a separate field of view that is to be superimposed upon the optical field of view.

The scan synchronizing and control system for the cathode ray tube 58 includes vertical scan circuits 60 and horizontal scan circuits 62, and it should be understood that the generalized representation of FIG. 1 is intended to represent the timing, blanking, amplifying and deflection functions for the horizontal and vertical scans respectively. The scan circuits 60 and 62 are operated independently of each other, but in synchronism with the individual horizontal and vertical scanning mechanisms in the infrared scanning system. The actual position of the scanning elements is detected and used for scan control. A linear transducer 64 includes an axial shaft 66 pivotally coupled to an arm 68 mounted on the support shaft 24 for the mirror 22. The linear transducer 64 generates a signal representative of the instantaneous angular position of the mirror 22, higher frequency components of the signal being eliminated in filter circuits 70, with the filtered signal being coupled to the horizontal scan circuits 62. Preamplifiers that may be utilized with the transducer circuit have not been shown for simplicity.

The vertical scan circuits are responsive to "on" and "off" signals generated to denote selected start-scan and end-scan angular positions for each passage of a different face of the prism 38 past a selected scanning position. A light source 72, which is energized by a power source depicted as a battery 73, is directed toward an angled mirror 74 through a slit 76 and a focusing lens 78. The mirror 74 is positioned at a 45° angle relative to the plane of the prism 38, and directs light from the source 72 against an adjacent face of the prism 38. When the adjacent prism face is parallel to the mirror 74, light is reflected against the face and directly back along the same path. Reflection occurs because the prism, while transmissive to infrared energy, reflects substantially all energy in the visible light spectrum. When the angular position of the prism 38 changes so that light from the mirror 74 does not impinge directly on the associated face in a precisely normal direction, the consequent relative tilt of the reflecting surface of the prism directs the re-reflected light off the mirror 74 to one side or the other. This right and left shifting of the light beam is utilized to energize angularly displaced photocells 80 and 82, each of which lies in a common plane with the mirror 74 and the light source 72, with the prism 38 rotating in the direction as shown. Light reflected to the left in the disposition of FIG. 1 falls on the first photocell 80, at a selected angle determined by the position of the interrupting optical slit 84. Of course, the slit 84 may be moved laterally relative to the path of the light so as to change the position in which the "on" signal is generated. The "off" photocell 82 is thus the opposite photocell 82. An interposed optical slit device 86 is similarly adjustable to control the precise position in which a signal is generated at the photocell 82. These "on" and "off" signals are applied to the vertical scan circuits 62 in a manner hereinafter described in greater detail.

The display system superimposes the display of the cathode ray tube 58 on the optical image presented in the right viewfinder eyepiece 14 only. Although the display could be presented to both eyes, by further imaging devices, the right eye is generally dominant and this arrangement has been found to be adequate and convenient. Again, shielding of the light source presented by the cathode ray tube 58 from other internal sources and from optical sensors may be used and has not been shown for the sake of simplifying the description of the invention. The image of the display provided by the tube 58 is reflected successively off a pair of angled mirrors 88 and 90, respectively, through interposed collimating lenses 89 into a path that is at the same level as the viewfinder 12, but along a path normal to the optical axis of the first viewing system. The collimating lenses 89, in effect, place the display face of the tube 58 at infinity. A dichroic element 92 is positioned in the path of the image, at a 45° angle to the path of the image, in alignment with the right viewfinder eyepiece 14.

The dichroic element 92 is a yellow filter that transmits the light of a red hue being passed by the first viewing system, but reflects the blue light being transmitted from the cathode ray tube 58. A compensating dichroic element 93 is in the light path to the left eyepiece 13, to equalize light levels. Consequently, the operator views a blue image of the display of the cathode ray tube 58, as it is superimposed on a red image as provided by the first viewing system. The relationship of the viewing systems, the usage of which hereinafter is described in more detail, is such that there is direct positional correspondence between points in the field of view as represented both by the optical system and by the scanning and display system.

A separate reference display also is provided in the viewfinder system, again in the right viewfinder eyepiece 14 alone. This reference display represents the indicia on a scale 94 controlled by the threshold control handle 54 as it is manipulated by the operator. As the handle 54 is turned, the resultant change in a threshold potentiometer or other adjustable element setting coupled to the handle 54 mechanism changes the position of the scale relative to a central reference needle (not shown) or other convenient marker. The scale 94 is illuminated by a lamp 96, energizes as by a battery 98. The lamp 96 is placed relative to a first angled mirror 100 so as to direct light in a direction normal to the viewing axis of the viewfinder eyepiece 14 through collimating lenses 101. A second small mirror 102 is positioned in the field of view of the viewfinder eyepiece 14, so that the image of the scale appears as a separate display superimposed upon the optical image so that temperature or any other reading may directly and distinctly be visible to an operator.

Figure 2:
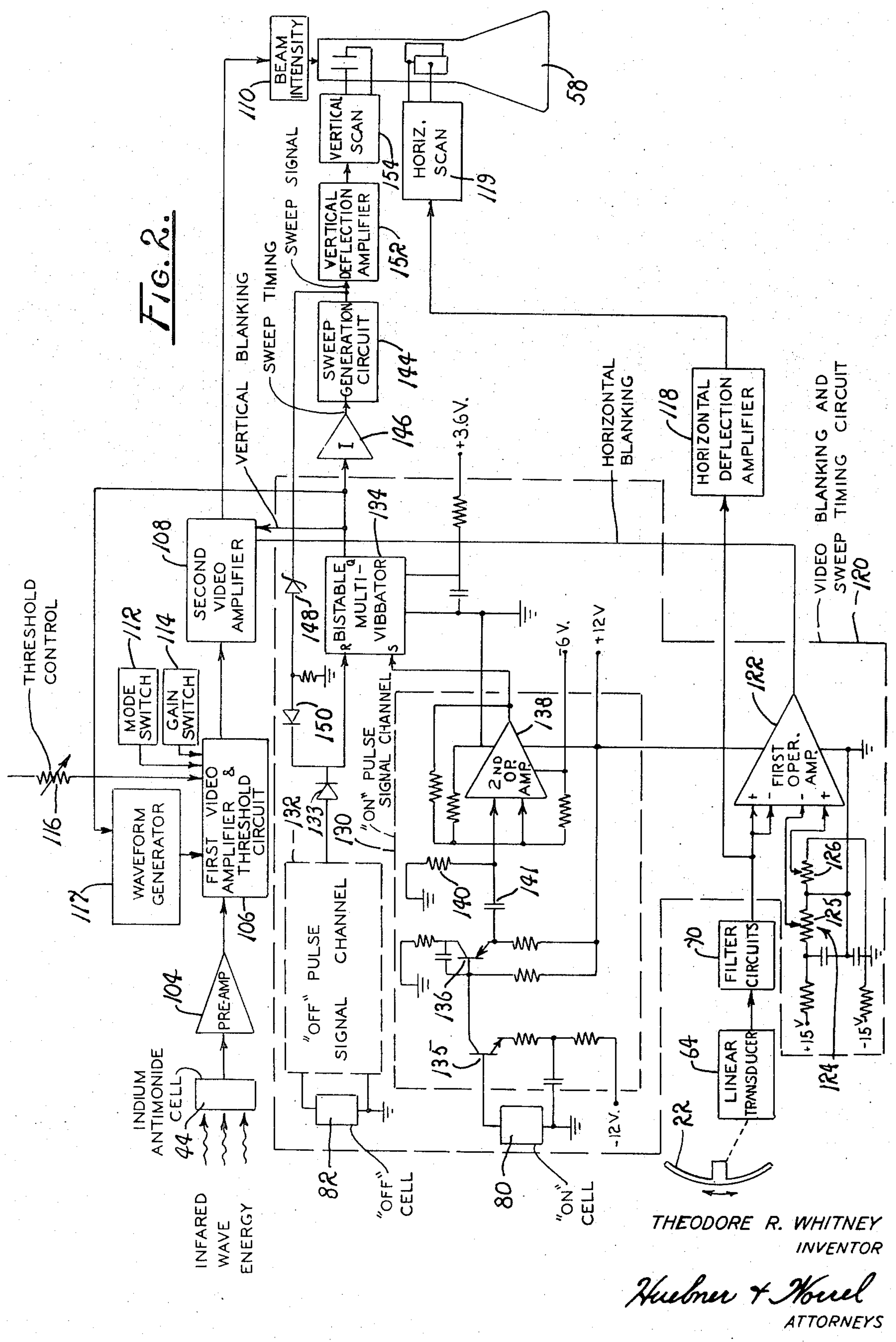
FIG. 2 is a combined block diagram and schematic diagram, showing units and elements of the circuitry of the system of FIG. 1 in greater detail.

Further details of a specific electronic system in accordance with the invention for utilization with the system of FIG. 1 is shown in the combined block diagram and schematic circuit diagram of FIG. 2. Those units in FIG. 2 that correspond directly to elements depicted in FIG. 1 are similarly numbered, but FIG. 2 shows substantially more components and functional units. Elements of the power supply have not been depicted except in conjunction with specific schematic circuits.

In the video signal chain, signals derived at the detector cell 44 are passed first through a preamplifier 104, and then successively through a first video amplifier and threshold circuit 106 and a second video amplifier 108 before being coupled to the beam intensity input 110, of the intensity control circuit 56 coupled with the cathode ray tube 58. At the first video amplifier 106, operator selection of different functions and relationships can be made by a mode switch 112, a gain switch 114 and a threshold control 116. The mode switch 112 and gain switch 114 have been shown as having single conductors for simplicity only, in actuality one of a number of different settings typically is employed. The threshold control 116 has been illustrated in simplified form as a separate adjustable resistor 116, although it will be appreciated that other adjustable devices may be used. As illustrated by the specific example below the threshold control 116 in actuality may be an element internal to the circuit 106.

The first video amplifier and threshold circuit 106 also is responsive to an applied signal from a triggered waveform generator 117 coupled to receive the horizontal blanking signal, the arrangement of this generator 117 being shown and described in greater detail hereafter.

In general terms, the video signal from the detector cell 44 not only is amplified in suitably wideband devices, but may be amplified either linearly or non-linearly, and variably adjusted with respect to both threshold and gain. In the non-linear or "threshold mode" section, and for a given setting of the threshold control 116, all input signals of lower amplitude than the established reference are effectively blocked. Signals above that amplitude are non-linearly amplified, with high gain to a selected maximum value. Thus any detected signal in excess of the threshold reference is caused to provide a bright beam intensity at the cathode ray tube in the non-linear mode, whereas the linear mode provides graduated display intensities.

The horizontal scanning signal generated by the linear transducer 64 and passed through the filter circuits 70 is applied to the horizontal deflection amplifier 118 controlling the horizontal scan elements 119, located within the horizontal scan circuits 62. The horizontal scan elements 119 may be either electrostatic or magnetic deflection elements for the cathode ray tube 58. Horizontal deflection of the beam in the cathode ray tube 58 is therefore directly dependent upon the instantaneous angular position of the mirror 22. It should be noted that the term "horizontal" relates to the placement of successive scan lines, and not the scans along the lines themselves, which is here termed vertical scan. The positional signal from the filter circuits 70 is also applied to video blanking and sweep timing circuits 120, that generate sweep signals for individual lines as well as horizontal and vertical blanking signals.

The signal from the filter circuit 70, for example, is applied to one side of a double ended first operational amplifier which may by way of example be a Motorola type MC 1711CG. The linear transducer 64 may be of the type providing a zero or null signal at a central position, with opposite polarity signals for deviations in each direction from the central position. Alternatively the transducer may generate amplitude or frequency modulated signals that are thereafter phased through demodulator (not shown). The input conductors therefore are coupled to both the (+) and (−) inputs of one end of the first operational amplifier 122, while the (+) and (−) inputs of the other end thereof are coupled to reference signal circuit which includes a resistive network 124 having a pair of potentiometers 125 and 126.

The potentiometers 125 and 126 are coupled at their center point to ground and at their opposite terminals to voltage sources of opposite polarity. The settings of the potentiometers 125 and 126 therefore determine reference levels for positive and negative inputs. The first operational amplifier 122 thus provides not output whenever the input signal at the first end is in the intermediate amplitude range, as defined by the limiting reference values. At the extreme limits of excursion of the mirror 22, however, or whatever limits are desired, as determined by the setting of the reference potentiometers 125 and 126, the input signal at the first end of the amplifier 122 exceeds the reference, and the horizontal blanking signal is generated for the second video amplifier 108.

The video blanking and sweep timing circuits 120 also include an "on" pulse signal channel 130, shown in schematic form and coupled to the "on" photocell 80, and an "off" pulse signal channel 132 which may be identical to the channel 130. Hence, the channel 132 is shown in generalized form coupled to the "off" photocell 82.

An on-pulse from the signal channel 130 is utilized to set a bistable multivibrator 134, starting the scan interval, whereas an "off" pulse from the signal channel 132 is utilized to reset the bistable multivibrator 134, through a diode 133 used in an "or" circuit as hereinafter described.

The bistable multivibrator 134 may be a Motorola type MC 802G, providing a positive output signal when reset, this signal being utilized as the principal output signal for vertical scan. A detailed description of the schematic and its function is not included for brevity, and, further, because a wide range of alternative circuits are available for use. The input signal to the multivibrator initially is passed through a pair of transistor amplifiers 135 and 136, to one input of a second operational amplifier 138 of a type having a second input held at a reference potential. The input signal is differentiated in a suitable circuit including a resistor 140 and a capacitor 141, to provide a sharp, high amplitude input pulse. The output pulse signal acquired from the amplifier 138 is applied to the setting input of the bistable multivibrator 134.

The output of the bistable multivibrator 134 that corresponds to the reset input is designated $\overline{Q}$, and is applied as the vertical blanking signal to the second video amplifier 108. The same signal is also applied to the sweep generator circuit 144, and is here shown as being passed through an inverter 146, primarily to distinguish the sweep timing signal from the vertical blanking signal (it being evident that the sweep generator circuit 144 can also effectively be enabled whenever the vertical blanking signal is off).

The sweep generator circuit 144 generates a conventional triangular wave triggered from a starting level and rising linearly to a final level determined by the duration of the sweep timing signal. To prevent the sweep signal from continuing indefinitely, in the event that the "off" pulse is not detected or improperly adjusted, the sweep signal is returned through a Zener diode 148 and a gating diode 150 to the reset input of the bistable multivibrator 134. The output level from the sweep generator circuit 144 that overcomes the back resistance of the Zener diode 148 provides a positive pulse to reset the multivibrator 134 and terminate the sweep. The sweep signal is also applied to a vertical deflection amplifier 152 and vertical scan components 154 within the vertical scan circuit 60, coupled with the cathode ray tube 58.

Figure 3:
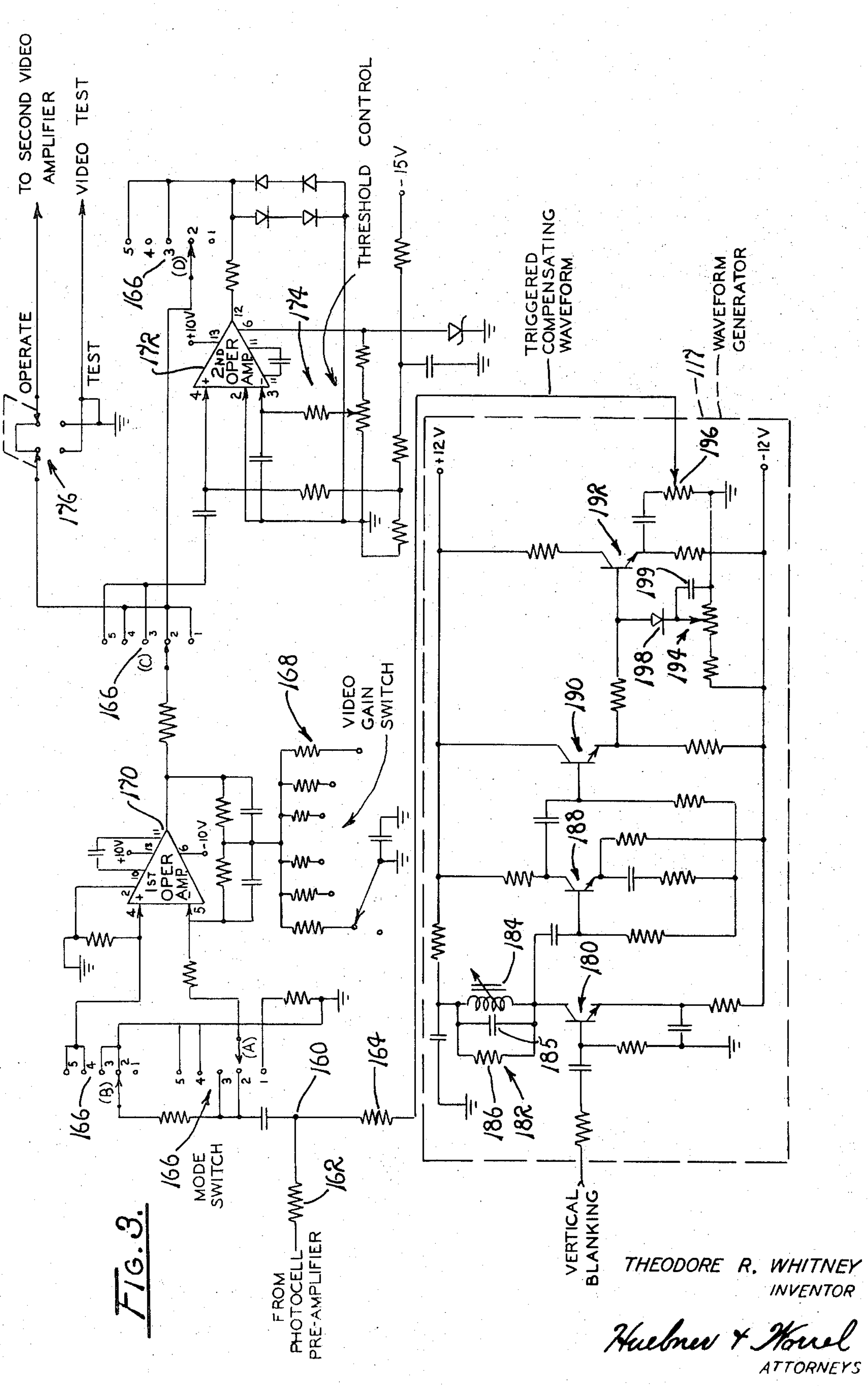
FIG. 3 is a combined schematic and block diagram representation of specific circuits which may be utilized in the arrangement of FIG. 2.

The waveform generator 117, the first video amplifier and threshold circuit 106, the mode switch 112, the gain switch 114 and the threshold control 116 are schematically illustrated in FIG. 2. When employing circuitry configured as illustrated in FIG. 3, signals acquired from photocell preamplifier 104 and the waveform generator 117 are applied to a summing junction 160 through respective summing resistors 162 and 164.

In the first video amplifier and threshold circuit 106, a four-pole five-throw mode switch 166, the poles of which are respectively designated 166 A, 166 B, 166 C and 166 D, define the circuit interconnections for operation in test, linear and non-linear (also called threshold) modes. A video gain switch 168 in the feedback path of a first operational amplifier 170 permits operation with temperature response in different ranges. The output signal derived from the first operational amplifier 170 is either used as the output signal from the circuit 106, or is passed to an input of a second operational amplifier 172, having an adjustable resistor 174 coupled in a conventional feedback circuit. Both of the operational amplifiers 170 and 172 may be RCA integrated circuit types CA 3030, having double ended inputs designated + and − respectively. For convenience and completeness, the actual connections of each of the various designated connecting terminals (2, 3, 4, 6, 10, 11, 12 and 13) of this type of circuit have been specifically shown. Various compensating and protective circuits utilized in conjunction with this arrangement have also been shown. The first operational amplifier 170, depending upon the setting of the video gain switch 168, provides substantially linear amplification, with different gains, of an input signal for covering a particular temperature range. As employed, "substantially linear" does not mean that precise linearity is achieved, inasmuch as it is desirable to refer to separate calibration curves for each gain setting when specific temperature measurements are to be made.

When the second operational amplifier 172 is coupled in series with the first amplifier 170, signals from the first stage that are in excess of the selected threshold level determined by the setting of the threshold control potentiometer 174 are amplified with high gain. An operator may thus adjust the threshold setting while viewing a particular display point, so that when there is an abrupt change between illumination and non-illumination he can read the temperature setting in the viewfinder.

These alternate interconnections of the operational amplifiers 170 and 172 are utilized in any one of five different modes as determined by the setting of the mode switch 166.

In mode switch position No. 1, the circuit path for the input signal derived from the photocell amplifier and the summing junction 160, is disconnected at both the first and second poles 166 A and 166 B. The signal input path to the first operational amplifier 170 is coupled through a series pair of resistors to ground, and the input is held at a reference voltage level. The output signal from the first operational amplifier 170 is provided through the third pole 166 C to a "video test" output through a two-pole double-throw switch 176, which in this mode is set to the "test" position to provide a signal level for calibration and adjustment purposes.

The second position setting of the mode switch 166 is as shown, with the input signal being applied to the signal input terminal of the first operational amplifier through the first pole 166 A, with the output signal therefrom being applied through the third pole 166 C and the "operate" position of the switch 176 to the second video amplifier 108. In this mode, the video input signal is applied to the negative input, and the signal representing a hot thermal energy source is effectively inverted, so that it appears dark in the display. The video signal is amplified with that may be termed "normal" gain, with the gain range being selected by the choice of the setting of the video gain switch 168. For the unconnected gain position of this switch, the gain value is approximately 4. With successively decreasing resistor values, as shown in the video gain switch 168, the settings give successive gain values of 8, 25, 50, 100, 225, and 400.

The third setting of the mode switch 166 places the second operational amplifier 172 in series with the first amplifier 170, without inversion of the second operational amplifier 172, so that the hot thermal energy source again appears dark. However, this is the non-linear or threshold mode, so that the gain is substantially enhanced and the selected threshold is defined. Output signals from the fourth pole 166 D are returned to the third pole 166 C and then through the "operate" position of the switch 176 to the second video amplifier.

The fourth and fifth positions of the switch 166 correspond to the normal and enhanced modes previously described for positions two and three, but here the input signals are passed through the contact terminals for the second pole 166 B, and applied to the + input of the first operational amplifier 170, so that the signals are inverted and a hot thermal energy source appears as a bright spot on the display.

In the compensating waveform circuits 117, the vertical blanking signal is utilized as an input signal for a first transistor amplifier 180 having a tuned circuit 182 including an adjustable inductor 184 arranged in parallel with a capacitor 185 and a resistor 186 in its collector path. The tune circuit 182 operates in conjunction with the transistor 180 as a blocking oscillator, to generate a half sine wave output signal having a cycle time determined by the setting of the adjustable inductor 184. The duration of this half sine wave is selected to be substantially equal to the scan time for a single line. The signal is then amplified in a series pair of transistors 188 and 190 and passed to an output transistor 192 having a threshold potentiometer 194 coupled in its base circuit and an amplitude potentiometer 196 coupled in its emitter circuit. A clamping diode 198 is coupled in series with the threshold potentiometer 194, which is shunted by a capacitor 199.

Sine wave signals from the second in the series of transistor amplifiers 190 are linearized into a somewhat triangular waveform by the integrating capacitor 199. The setting of the threshold potentiometer 194 determines the level of operation of the clamping diode 198, and the clipping of the peak of the waveform. The output transistor 192 is coupled as an emitter follower, and the setting of the amplitude potentiometer 196 preserves the general shape of the input signal but adjusts the amplitude of the output wave to a desired level.

The compensating waveform is utilized in conjunction with the arrangement of the infrared scanning system depicted in FIG. 1. As described in conjunction with that system, the slit 36 is on the far side of the silicon prism 38 from the indium antimonide cell 44. The optical path through the prism 38 toward the cell 44 lies normal to the plane of one of the prism faces only at one instance in time as a given prism face scans through the light beam. At this instance in time, however, the cell 44, which is maintained at cryogenic temperature, in effect "sees" its own image. At other positions of the given prism face displaced from the normal, the cell sees a lesser amount of its own image. The net effect is a relatively long term deviation or aberration in the input video signal, which may be compared to a shift in the DC level, peaking at the center position of a line scan. Some systems are known that have found it necessary to employ the prism in front of the slit, relative to the detector cell. In accordance with the present invention, however, the repeated deviation in the video signal for each line scan is effective compensated by the triggered waveform generator 117, which generates a waveform of appropriate amplitude and time constant to be combined with the input signal at the summing junction 160 (FIG. 3).

To adjust the waveform generator 117 of FIG. 2, the operator points the scanning system toward a substantially constant energy source, and observes the line deviations on the face of the cathode ray tube 58. Then by adjusting the duration of the sine wave generated from the tuned circuit 182, in conjunction with the transistor 180, as well as the clamping level controlled by the threshold potentiometer 194 and the output level determined by the amplitude potentiometer 196, each line scan may be linearized without affecting the input video signal.

The operation of the system of FIGS. 1 and 2 provides a uniquely informative information display as to the thermal energy distribution within a given field of view. Assume that the scanning drive motors 28 and 40 (FIG. 1 only) are set to provide a scanning motion of 20 fields per second and 80 lines per field, and that the threshold control handle 54 (FIG. 1) is set so the threshold control 116 for the first video amplifier and threshold circuit 106 (FIG. 2) establishes a particular reference temperature. Assume, also, that the system is in the threshold mode. The operator, looking in the viewfinder 12, may then study an optical field of view having a superimposed infrared field, preferably at its center. The gain of the horizontal and vertical deflection amplifiers 118 and 152 respectively are set such that a point source in the infrared field corresponds to the position of the same source in the optical field. Thus as the viewfinder system is scanned the wideband high detail information display presented in the optical field is utilized to provide spatial reference and background information. The red hue introduced by the filter 16 does not diminish the detail, although by substantially reducing the intensity the optical field does not dominate visually. Instead, the contrasting bright blue illumination generated in the display of the infrared scanning system readily identifies all thermal energy sources whose radiation levels are in excess of the selected threshold.

The operator looks through the viewfinder eyepieces 13 and 14 at the optical field of view as transmitted through the red filter 16. Electromagnetic wave energy in the infrared wavelengths in the narrow view field is transmitted through the silicon window 19 and optionally through the 4 micron filter 20. The narrow central view field is scanned both horizontally and vertically by the combination of the mirror 22 and the prism 38. It should be noted that the raster is not a conventional TV raster, but that successive fields alternate, with the display lines shifting toward the right in one field and then toward the left in the next field due to the oscillating action of the mirror 22. Polar coordinates may be used, as well as curvilinear scans or other types of scanning systems. At twenty fields per second and with a phosphor having moderate persistance, the display on the face of the cathode ray tube 58 appears flicker free. This display is reflected off the mirrors 88 and 90, and then off the dichroic element 92 into the viewfinder to be superimposed on the optical image, which, in practice, is focused at infinity. Concurrently, the setting of the threshold control handle 54, as evidenced by light reflected off the reference portion of the scale 94 is superimposed on the right viewfinder eyepiece 14.

Figures 4, 5, 6:
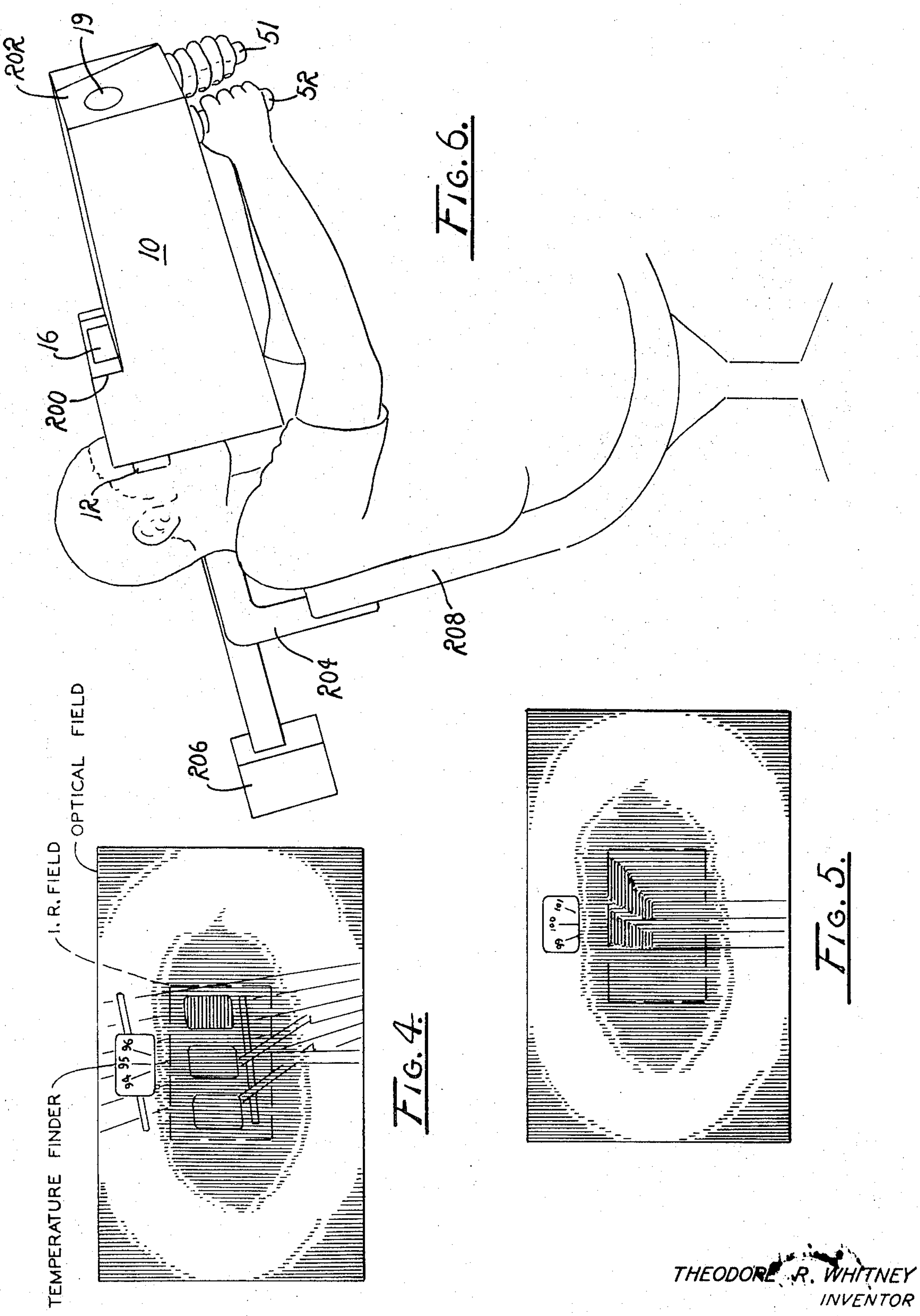
FIG. 4 is a somewhat simplified pictorial representation of one example of a display presented to an operator by the system of FIG. 1.
FIG. 5 is a somewhat simplified pictorial representation of another example of a display presented to an operator by the system of FIG. 1.
FIG. 6 is a perspective view of a particular installation of the system embodying the invention.

Typical displays visible to an operator are depicted in FIGS. 4 and 5. In one portion of the optical field, the operator views the temperature finder, representing the reading of the threshold setting chosen for temperature detection. The infrared field, represented on the cathode ray tube 58, has no distinct border, but is indicated by dotted lines for comparison purposes. Within this field, thermal energy sources having thermal radiation levels in excess of the threshold appear as superimposed illuminated objects. When the system is operated in the non-linear mode, all parts of a "hot" body will have virtually the same illumination, to enable the "seeking" function to be carried out more readily. In a linear amplification mode, the temperature gradiations will be much more linear. Filtering of the IR band and non-linear modes are preferred in high ambient radiation conditions.

The view of FIG. 4 for illustrative purposes, depicts a typical grouping of three oil or water cooled transformers associated with a conventional power transmission line, the right one of which in the figure is excessively heated and therefore in excess of the selected threshold. Hence this transformer is illuminated in the field of view (appearing blank in FIG. 4). This transformer stands in distinct contrast to the lefthand two transformers, in FIG. 4 which, as illustrated, tend to merge into the background.

As further illustrated in FIG. 5, emanations from a pair of smokestacks are susceptible to detection and are represented as they appear in the field of view of a system in which embodies the instant invention. The temperature of the emanations may be measured, and leakage points along the smokestacks may be determined by visual examination.

It should be appreciated that systems provided in accordance with the invention utilize an advantageous combination of a relatively wide bandwidth optical display, in conjunction with a relatively narrow bandwidth, electronically generated display of the same field, to overcome the limitations of prior infrared scanning systems of providing uniquely meaningful information.

In contrast to the bandwidth of a typical television system, which is nominally approximately 4 megacycles, the relatively low contrast but high detail optical field of view has an information bandwidth that is very much greater. Infrared scanning systems have bandwidths of approximately 160 kilocycles or less and provide limited picture information. With the present system, however, the operator may locate and scan meaningful objects very rapidly while at the same time observing a highly meaningful infrared display. Thermal energy sources are spatially oriented within the optical field of view and therefore readily are identified, particularly because of the extreme color contrast. Furthermore, the selected thermal energy sources are identified and displayed in essentially binary or nonambiguous fashion, that is, they either are shown to exist or not, depending upon their relationship to the threshold setting. Consequently, a relatively low scanning rate of 30 cps or less can be employed in the infrared scanning system so as to obtain high sensitivity without limitation on change of field of view.

It is well known that infrared instruments which respond to radiation within a given band of wavelength typically measure the total radiant emittance of objects within the field of view. Radiant emittance varies in direct proportion to the emissivity of the object as that wavelength and as a power function of the object's temperature. Given that the emissivity of an object is known, its temperature can be measured by measuring the radiant emittance. If two or three similar objects are situated side by side, where each is presumed to have approximately the same emissivity, the difference in their radiant emittance is interpretable as a difference in their temperature. Generally an operator can become familiar with the radiant emissivities of common objects: flesh, painted surfaces, bare metal, etc. This knowledge can enable operators to make judgments which, in any given instance, will enable them to measure the temperature of the object quite closely. If object emissivities are completely unknown, the relative temperatures of several similar objects can still be determined. If exact emissivities are known, exact temperatures can be measured.

In a particular example of a practical system in accordance with the invention, the bandwidth of the infrared scanning system is approximately 160 KC, while the system has an angular resolution of approximately one angular mil. Such resolution is greater than the definition attainable with typical cathode ray tubes. The unitary construction of the system within a single housing permits an operator to scan a broad field or concentrate on particular objects, and utilize suitable selections of gain, threshold and mode to analyze all questionable or ambiguous subjects in the field of view.

Although the emphasis heretofore has been on utilization of the nonlinear mode in this description, use of the linear amplification mode to provide a wide gradation in the intensity of the display is an important adjunct inasmuch as this provides a thermal picture. The thermal picture mode is utilized in such applications as analyzing heat losses from insulated structures and vessels, and the temperature distribution on the human body.

Another important aspect of systems in accordance with the invention derives from the complete independence of the scanning systems, and the utilization of a display raster that is controlled directly by the scans. It was previously mentioned in conjunction with FIG. 1 that the DC motors 28 and 40, controlling the mirror 22 and the prism 38 respectively, may be changed in speed simply by changing the applied voltage. The operator may make such changes in accordance with the subject matter he is viewing. Speeding up the scan rates increases the information bandwidth of the infrared scanning system, but at the sacrifice of contrast and detail in the detected video. The scan rates can be slowed substantially for more detailed examination of a given field of view. The scan rates may also be varied completely independently. Thus, the horizontal scan may be kept to 20 fields per second, but the vertical scan may be altered so as to provide substantially more or less than the 80 lines per field in the present example. Where a larger or different type of cathode ray tubes are utilized or where the electron beam is finely focused, the resolution of the infrared scanning system may be more fully realized.

FIG. 6 illustrates an actual installation of a system which embodies the invention, depicting its usage by a single operator under typical conditions. As illustrated, the housing 10 includes a foreshortened top portion, recessed at a front panel 200. Within this panel the red light filter 16 is mounted. The filter 16 is disposed along an optical viewing axis along which an operator views a selected field of view as he looks into the viewfinder 12. The entire front panel 202, for the bottom portion of the housing 10, is tilted to avoid internal reflections as previously described. The operator grips control handles 51 and 52 (other controls not being shown) on the underside of the housing 10 adjacent the front portion thereof, both to physically manipulate the housing 10 as well as to control gain, mode and threshold settings. The housing 10 mechanically is coupled by an arm assembly 204 to an extended counterweight 206, and also to a swivel chair 208 in which the operator is seated.

Thus, by virtue of the mechanical arrangement and the compact nature of the internal assembly within the housing 10, the operator may swing the system so as to scan continuously, or point the system toward any desired remote object to acquire a selected field of view. The compact arrangement of the internal system and the superimposition of the optical display and the internally generated infrared display enables a single operator to locate and analyze a maximum number of objects of interest. A number of alternative arrangements and applications of systems in accordance with the invention will suggest themselves to those skilled in the art.

One prominent usage of such systems derives from the ability to locate and track specific radiation sources. Thus in the measurement of pollution emissions, it becomes possible to make quantitative measurements, remotely, of specific pollutants. The emission from a moving vehicle, for example, is in effect a gaseous body having certain concentrations of different known constituents such as carbon dioxide, carbon monoxide, and oxides of nitrogen. The temperature of the emissions may first be measured, including all the contributing constituents. Then, a bandpass filter encompassing the characteristic wavelength of the emissions of a particular constituent may be inserted in the scanning system and an amplitude reading may be taken of the particular constituent. Knowing the temperature of the constituent, which corresponds to the temperature of the total mass, the concentration of the particular constituent may be ascertained. This feature is of importance not only to the remote measurement of moving vehicles, not heretofore feasible, but also with respect to the measurement of the temperature and constituents of effluents from smokestacks and other stationary sources. It will also be appreciated that different display and viewing techniques and arrangements might be used. Where light and illumination levels are high, standard intensity reducing filters are interposed in the optical viewing path, along with a red or other filter. Where light levels are low, no color or intensity reducing filters whatsoever need by employed. Although, as previously described, it is convenient to superimpose the electronic scanning display in the center of the field of view, it may be disposed in other positions, or split screen techniques may be utilized. It will also be recognized that, for particular applications, the optical viewing system will be supplanted by a wideband television camera and display system. Obviously, however, such an arrangement has limited economic justification in view of the simplicity of the optical viewing system.

A number of other expedients will also suggest themselves to those skilled in the art, but the invention in all of its modifications and alternative forms will be understood to be defined by the scope of the appended claims.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. An energy data display system comprising:

A. means responsive to energy rays of a predetermined first band of wave lengths for providing a first visual image of a first field of view;

B. means responsive to energy rays of a second predetermined band of wave lengths different from the first band for simultaneously providing a second visual image of a second field of view including at least a portion of the first field of view, said last means including means for setting a selected threshold level and making said last means responsive to energy sources in said second field of view emitting energy rays of said second predetermined band of wave lengths of energy levels in excess of said selected threshold level; and C. means for concurrently displaying the first and second visual images in substantially the same spatial relationship that their respective fields of view bear to one another.

2. The invention defined in claim 1, wherein said second field of view is smaller in area than and located within said first field of view.

3. An energy data display system comprising:

A. means providing an optical image of a field of view;

B. scanning means responsive to energy rays of wave lengths outside of the normal visual range for scanning a target area having a predetermined spatial orientation with respect to the field of view, said scanning means including means for setting a selected threshold level and making said scanning means responsive to energy sources in said target area emitting energy rays outside of the normal visual range of energy levels in excess of said selected threshold level; and C. display means controlled by the scanning means for generating a visible image spatially oriented with respect to the optical image simulative of the actual spatial orientation of the target area to the field of view.

4. The invention defined in claim 3, wherein said target area is smaller in area than the field of view and is located within the field of view.

5. A display system for use in performing a real-time examination of a selected field of view comprising:

A. a first system responsive to radiation reflected from said field of view for presenting a first image;

B. a second system simultaneously responsive to radiation emitted from said field of view for presenting a second image, said second system including means for setting a selected threshold level and making said second system responsive to energy sources in said field of view emitting radiation of energy levels in excess of said selected threshold level; and C. a third system for combining said first and second images into a composite image.

6. The system of claim 5 wherein said second image is an electronically generated image.

7. A thermal energy data display system comprising:

A. means providing an optical image of a field of view;

B. infrared scanning means having a selected scan rate and scanning at least a portion of said field of view;

C. cathode ray tube display means controlled by said scanning means for generating a visible image of at least a portion of the field of view, said display means comprising adjustable threshold high gain amplifier means providing substantially constant intensity display levels for sources within the field of the infrared scanning means and having thermal energies in excess of a selected threshold level; and D. optical means for superimposing the generated image on the optical image.

8. The system of claim 7, wherein said means providing an optical image includes optical filter means having a selected color, and wherein said cathode ray tube generates a display of a distinctly different color.

9. The invention defined in claim 7, wherein said scanning means scans only a constituent portion of said field of view.

10. A thermal energy data display system comprising:

A. means providing a relatively low contrast optical image of a field of view in a first distinct color;

B. infrared scanning means scanning at least a portion of the field of view;

C. cathode ray tube display means controlled by said scanning means for generating a visible image in a second color distinct from the first of at least a portion of the field of view scanned by said scanning means, said display means comprising adjustable threshold amplifier means responsive to infrared energy sources having energy levels in excess of its selected threshold level; and D. optical means for superimposing the generated image on the optical image, there being positional correspondence between the optical and generated images.

11. The system of claim 10, wherein said infrared scanning means includes at least a pair of independent scan means for scanning the field of view in a selected raster, and wherein said display means includes at least a pair of deflection systems, each independently controlled by a different scan means.

12. The invention defined in claim 10, wherein said scanning means scans only a constituent portion of the field of view.

13. A thermal energy display system providing a visible display of a selected field of view comprising:

A. a first relatively wide information bandwidth viewing system for the field of view including means providing a first representation of the field of view;

B. a second relatively narrow information bandwidth viewing system for at least a portion of the field of view simultaneously providing a second representation of the corresponding portion of the field of view different from the first representation, said second viewing system including means for setting a selected threshold level and making said second viewing system responsive to information in its bandwidth having levels in excess of said selected threshold level; and C. means including optical means superimposing the representations of the first and second viewing systems with positional correspondence between points in the field of view represented therein.

14. The system of claim 13, wherein said first viewing system views a selected viewing field and said second viewing system views an interior portion of the selected viewing field, and wherein the first and second representations are of contrasting colors.

15. The system of claim 14, wherein said first viewing system has a bandwidth in excess of approximately four megacycles and said second viewing system has a bandwidth of the order of 160 kilocycles.

16. A thermal energy display system providing a visible display having both detailed space field and high contrast thermal point source representations of objects located within a selected field of view comprising:

A. a first relatively wide information bandwidth viewing system viewing the field of view and including means providing a relatively low contrast high detail representation in a selected color of the field of view;

B. a second relatively narrow information bandwidth viewing system viewing at least a portion of the field of view providing a relatively high contrast low detail representation of the corresponding portion of the field of view in a second color different from the selected color, said second viewing system including means for setting a selected threshold level and making said second viewing system responsive to information in its bandwidth having levels in excess of said selected threshold level; and C. means including optical means superimposing the representations provided by the first and second viewing systems with positional correspondence between points in the field of view being represented therein.

17. A thermal energy source identification system providing, for an operator, a readily identifiable display of thermal energy sources having selected thermal energy levels within a chosen field of view comprising:

A. an optical viewing system, including image viewing means, for the selected field of view, said optical viewing system including color filter means substantially attenuating light energy transmitted therethrough;

B. an infrared scanning system including cathode ray tube display means, said infrared scanning system being disposed to scan thermal energy sources within a selected portion of the selected field of view, and having a scan rate substantially less than approximately 30 fields per second, said cathode ray tube display means generating a pattern in a distinctly different color from said color filter means, said infrared scanning system also including adjustable threshold high gain control amplifier means responsive to energy levels within the scan field for providing selected display light intensities for thermal energy levels in excess of a selected amplitude; and C. optical means for superimposing the display pattern of said cathode ray tube means on the image of said viewing means with positional correspondence for sources within said field of view.

18. The invention as set forth in claim 17, wherein said adjustable threshold means includes means adjustable by an operator for changing the threshold setting, and wherein said system further includes optical indicia means coupled to said adjustable means and representative of the threshold setting, and optical display means for superimposing the significant portion of said indicia means within the field of view in the viewfinder.

19. A scanning control system for a scanning and display system of the type scanning a field of view in raster fashion and generating a visual display, comprising:

A. an optical scanning system including rotating prism means positioned along an optical axis for providing scan along successive lines in a selected direction;

B. light source means positioned adjacent said rotating prism device and including means reflecting a light beam off said prism surfaces at varying angles dependent on the angular instantaneous position of said prism surfaces;

C. electronic display means including triggered sweep generator means; and

D. means including a pair of light sensor means spatially separated along the reflected light path of said light source means, and disposed so as to detect the start and end of scan by individual surfaces of said rotating prism device, and each coupled to control said triggered sweep generator means.

20. The invention as set forth in claim 19, wherein said optical scanning system comprises an infrared scanning system and wherein said prism means in transmissive to infrared wave energy and at least partially reflective to wave energy at visible wavelengths, and wherein said electronic display means comprises cathode ray tube means and said sweep generator means controls scan of the cathode ray tube along beam successive lines.

21. The invention as set forth in claim 20, wherein in addition said optical scanning system includes oscillating mirror means for providing scan in a selected direction to provide successive beam lines to said rotating prism means, said scanning control system includes transducer means coupled to said mirror means for generating a signal representing the instantaneous angular position of said mirror means, and said cathode ray tube includes means responsive to said transducer means for controlling scan of the cathode ray tube beam in the direction of the successive lines.

22. A detection system for a beam of thermal energy directed along a path, for providing a linearized scan output signal while scanning along individual lines in a field of view, comprising:

A. optical prism means in the beam path for providing scan along beam lines;

B. beam detector means positioned along the beam path at a point subsequent to said optical prism means, said detector means providing a time varying beam intensity signal;

C. signal amplifier means coupled to said detector means and including summing junction input means, one input of said summing junction being coupled to said detector means;

D. waveform generator means providing a selected waveform when triggered, the output of said waveform generator means being coupled to a second input of said summing junction; and E. means responsive to the angular position of said prism means for triggering said waveform generator means.

23. The invention as set forth in claim 22, including in addition optical slit means in the beam path prior to said optical prism means, and wherein said beam detector means includes cryogenic cooling means.

24. The invention as set forth in claim 23, wherein said waveform generator includes adjustable tuned circuit means for controlling the cycle time of the selected waveform generated by said waveform generator and threshold and amplitude adjustment means for clipping the peak of the selected waveform and controlling its output level.

25. An analytical instrument for remote reading of particular constituents of a gaseous effluent comprising:

A. a viewing system for a selected field of view;

B. an infrared scanning system for scanning thermal energy sources within at least a portion of the field of view, said scanning system including bandpass filter means for passing only a selected portion within the infrared spectrum detector means, and adjustable threshold amplifier means coupled to said detector means;

C. display means coupled to said amplifier means, and disposed to superimpose a display of the scanned portion of said field of view on the image of said field of view presented by said viewing system; and D. means for generating a reference signal for comparison to selected thermal energy sources scanned by said infrared scanning system.

26. The invention defined in claim 25, wherein said display means is operable to superimpose the display of the scanned portion of said field of view on the image of said field of view in substantially the same spatial relationship that the scanned portion has to said field of view, and the scanned portion is a constituent portion of said field of view.

27. A portable, manipulatable object viewing system for use by a single operator to scan and view remote thermal energy sources, comprising:

A. a housing having an optical viewing axis disposed between front and back portions thereof, and including a view position at the back portion;

B. optical viewing means disposed along the optical viewing axis of the housing, said optical viewing means defining a selected field of view;

C. thermal energy scanning means disposed within said housing principally along a second axis substantially parallel to the optical viewing axis and viewing at least a portion of the selected field of view;

D. display means coupled to said scanning means and providing a visible substantially planar display of the corresponding portion of the field of view; and E. light image reflecting means disposed partially adjacent said display means and deflecting the display thereof onto the optical viewing axis for viewing at the view position.

28. The invention as set forth in claim 27, wherein said display means comprises a cathode ray tube means, and wherein said light image reflecting means includes selective reflecting means along the optical viewing axis.

29. The invention as set forth in claim 28, said system further including control means coupled to the exterior of said housing for providing adjustment of at least one parameter of said display means, indicia means disposed within said housing and coupled to be controlled by said control means, and light imagining means including reflector means and light source means providing a light path from said indicia means into said optical viewing axis for view by the operator.

30. The invention as set forth in claim 28, wherein said optical viewing means includes filter means disposed along the optical viewing axis and providing a relatively low contrast image in the field of view; wherein said cathode ray tube means provides a display of a selected color, and wherein said light image reflecting means includes at least one dichroic element along the optical viewing axis, said dichroic element being disposed at an angle, and passing the image from the selected field of view while reflecting the cathode ray tube image.

31. The invention as set forth in claim 30, wherein said optical viewing means includes red filter means, and wherein said cathode ray tube and said dichroic element are in a combination of blue and yellow colors.

32. The invention as set forth in claim 31, wherein said scanning means includes a front window in the front portion of said housing along the second axis, said front window being at an angle other than normal to the second axis and wherein in addition said scanning means includes infrared energy filter means disposed along said second axis.

33. A method of analyzing radiant energy characteristics of remotely located radiant energy sources comprising forming an optical image of a selected area of a remote energy source, and simultaneously forming an infrared image of at least a portion of said selected area superimposed on said optical image and in spatial registry with the optical image of said portion.

34. The method of claim 33 in which the optical image is formed with high detail but relatively low contrast, and the infrared image is formed with a relatively narrow information band width but high level of contrast.

35. The method of claim 33 in which the optical image and the infrared image are formed in contrasting colors.

36. A method of analyzing radiant energy characteristics of remotely located radiant energy sources comprising forming an optical image of a selected area of a remote energy source, and simultaneously forming an infrared image of a predetermined constituent portion of said selected area superimposed on said optical image and in spatial registry with the optical image of said constituent portion.

37. An energy data display system for analyzing radiant energy characteristic of remotely located radiant energy sources comprising:

means for forming an optical image of a field of view;

scanning means for scanning a predetermined constituent portion of said field of view and forming an infrared image thereof, said scanning means including means for setting a selected threshold level and making said scanning means responsive to infrared energy sources in said constituent portion having energy levels in excess of said selected threshold level; and means for concurrently displaying said optical and infrared images in substantially the same spatial relationship that said constituent portion has in said field of view.

38. A thermal energy data display system comprising:

A. means providing a relatively low contrast optical image of a field of view in a first distinct color;

B. infrared scanning means scanning at least a portion of the field of view, said infrared scanning means including at least a pair of independent scan means for scanning the field of view in a selected raster, one of said independent scan means being comprised of an oscillating concave mirror and another of said independent scan means being comprised of a rotating prism, said scanning means additionally including a pair of adjustable speed DC motors each coupled to drive a different one of said scan means;

C. cathode ray tube display means controlled by said scanning means for generating a visible image in a second color distinct from the first of at least a portion of the field of view scanned by said scanning means, said display means including at least a pair of deflection systems each independently controlled by a different one of said scan means; and D. optical means for superimposing the generated image on the optical image, there being positional correspondence between the optical and generated images.

39. The system of claim 38 further comprising transducer means adapted to sense the instantaneous angular position of said mirror, and optical means disposed to sense the instantaneous angular position of said prism, and wherein said display means includes sweep timing means coupled and responsive to said transducer means, optical means for generating blanking signals, and video amplifier means responsive to said scanning means and said blanking signals adapted to control beam intensity of said cathode ray tube display means.

40. A method of analyzing radiant energy characteristics of a selected area, comprising:

forming an optical image of the selected area; and simultaneously forming an infrared image distinguishable from the optical image of at least a portion of said selected area of infrared energy sources therein having energy levels in excess of a selected threshold level, said infrared image being formed superimposed on said optical image and in spatial registry therewith.

41. The method defined in claim 40, including selectively changing the threshold level of the infrared image being formed to determine the energy levels of the infrared energy sources.

42. A display for use in performing a real-time examination of a selected field of view comprising:

A. a first system responsive to radiation from said field of view for presenting a first visual image;

B. a second system responsive to radiation emitted from a portion of said field of view for presenting a second image, said second system including amplifier means responsive to energy levels of radiation from said portion of the field of view in excess of a predetermined amplitude for displaying energy level intensities of said portion of the field of view; and C. a third system for combining said first and second images into a composite image in which the energy level intensities displayed by the second system are spatially oriented with respect to the visual image of the first system to facilitate location of sources of energy level intensities in excess of said predetermined amplitude.

* * * * *